Figure 1:
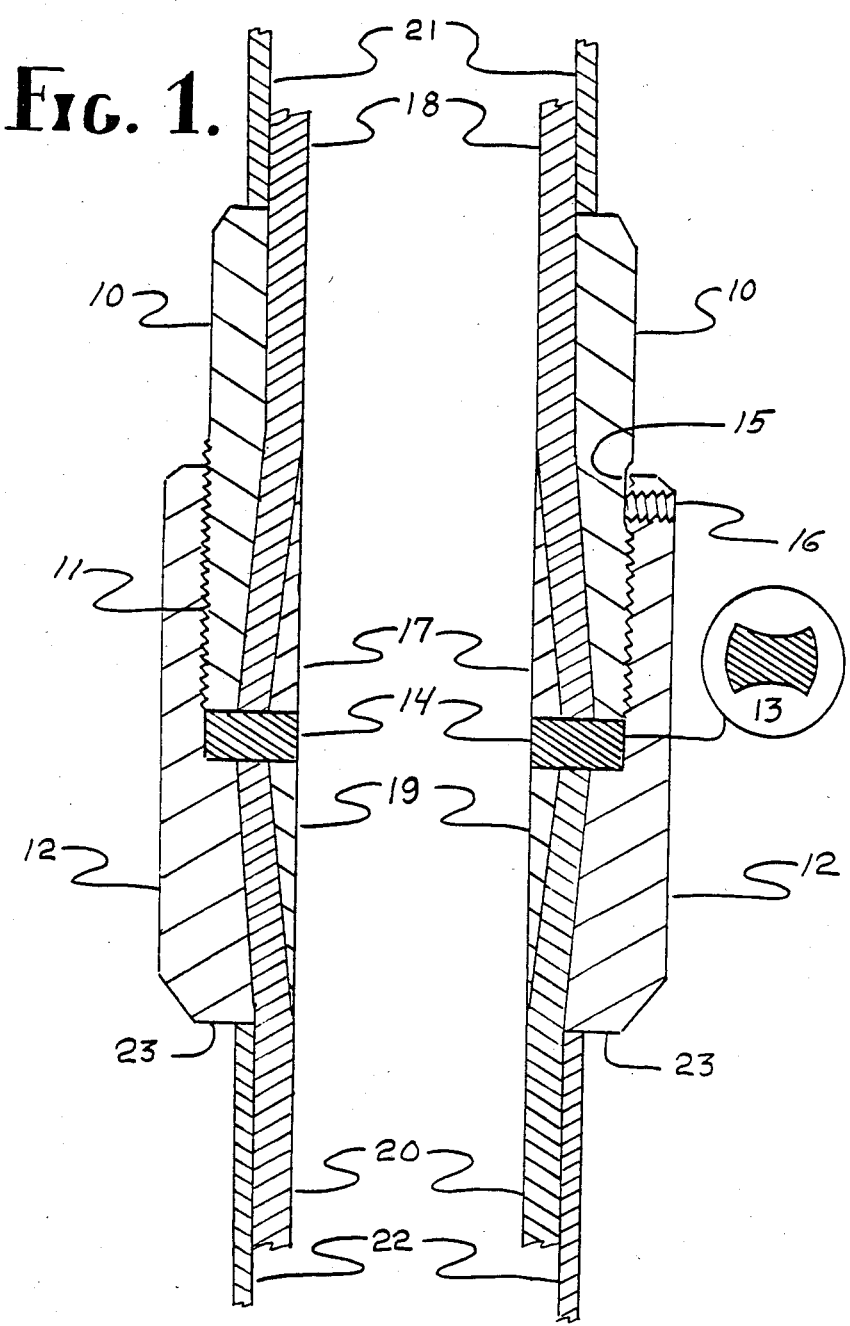

United States Patent [19]

Ruhle

[11] Patent Number: 4,548,428
[45] Date of Patent: Oct. 22, 1985

[54] ANTI BACK-OUT STEEL COUPLING SYSTEM FOR NONMETALLIC COMPOSITE PIPE

[76] Inventor: James L. Ruhle, 2535 E. Balfour Ave., Fullerton, Calif. 92631

[21] Appl. No.: 665,995

[22] Filed: Oct. 29, 1984

[51] Int. Cl.⁴ .................................... F16L 33/18
[52] U.S. Cl. ...................... 285/90; 285/246; 285/353
[58] Field of Search ............... 285/353, 90, 149, 246, 285/247 (U.S. only), 334.1, 334.5

[56] References Cited

U.S. PATENT DOCUMENTS

| | | | |
|---|---|---|---|
| 579,986 | 4/1897 | Jordan | 285/353 X |
| 904,673 | 11/1908 | Bideker | 285/90 X |
| 1,091,759 | 3/1914 | Paradis | 285/149 |
| 1,344,774 | 6/1920 | Stafford et al. | 285/90 |
| 3,352,577 | 11/1967 | Medney | 285/246 |
| 3,357,725 | 12/1967 | Champion | 285/353 |

FOREIGN PATENT DOCUMENTS

| | | | |
|---|---|---|---|
| 1258445 | 3/1961 | France | 285/246 |
| 777859 | 6/1957 | United Kingdom | 285/246 |
| 810884 | 3/1959 | United Kingdom | 285/246 |

Primary Examiner—Thomas F. Callaghan

[57] ABSTRACT

A steel coupling system that is joined together by standard oil-well tubing threads, but is prevented from backing out by a set screw system, and is sealed by a compressible gasket, which creates an internally flush, or straight transition across the inside surface of the coupling system. Both the male and female halves of the coupling system are affixed to unidirectional, or longitudinally-reinforced nonmetallic composite pipe by a friction-grip technique that radially compresses the composite pipe wall at right angles to the longitudinal reinforcing fibers. The coupling system is designed in such a way that the greater the axial tensile stress across the coupling the greater is the gripping action, or the compression of the nonmetallic composite pipe wall.

1 Claim, 1 Drawing Figure

ANTI BACK-OUT STEEL COUPLING SYSTEM FOR NONMETALLIC COMPOSITE PIPE

BACKGROUND

Nonmetallic composite pipe, employing reinforcing fibers such as glass, graphite, and Kevlar, and bonded together by a thermosetting resin matrix has been joined together in the past by a wide variety of threaded coupling systems. Fiberglass-reinforced composite pipe, employing threaded couplings, has been used, in particular, in a wide variety of subsurface applications including water-well casing and oil-well tubing.

However, threads cut into fiberglass-reinforced composite pipe cut the reinforcing fibers as well as the resin matrix, thus reducing considerably the structural strength of the composite pipe at the threaded couplings. Consequently, the strength of such threaded couplings is limited by the interlaminar shear strength of the resin matrix rather than the strength of the reinforcing fibers. As a result, the strength of the coupling, in particular, its axial tensil strength, is considerably less than the strength of the pipe body, in particular, its axial tensile strength. Therefore, if a coupling system were designed that was at least as strong as the composite pipe body, the composite pipe, with its equally-strong coupling system could be subjected to much more demanding service, involving much higher tensile loads.

This invention describes a completely new approach to joining together nonmetallic composite pipe by means of a steel coupling system, which is equal in strength to that of the composite pipe body.

The thread system employed to join the two halves of the steel coupling together is of the type used on oil well tubing, and was selected because of the low pitch of the threads, which is compatible with the gasket sealing system and the anti back-out set-screw system. Furthermore, this type of threaded connection is not plagued by joint swelling problems in high-tensile-load and high-temperature subsurface applications involving deep oil and gas wells, and geothermal wells.

The coupling system, unlike the standard oil-well tubing coupling, when completely threaded together, results in an internally-flush central passage. The internally-flush central passage, made possible by the compressible gasket system reduces the probability of fluid-flow irregularities at the couplings, which, otherwise might damage the coupling system as a result of concentrated abrasion or cavitation.

Each half of the steel coupling is connected to longitudinally-reinforced composite pipe by means of the gripping action created by an inner tapered steel friction sleeve, which is pressed, at the time of fabrication, into the end of the composite pipe, thus radially expanding and radially compressing the wall of the composite pipe between the inner tapered steel friction sleeve and the tapered inner surface of the steel half-coupling. Such a friction-grip connection between the steel coupling and the composite pipe wall translates the axial tensile stress across the coupling system into radial compressive stresses exerted upon the composite pipe wall and the inner tapered steel friction sleeve, and into concentric tensile stresses around the internally-tapered steel half-coupling. Consequently, the greater the axial tensile stress across the coupling system the greater is the gripping action created by the radial compression of the composite pipe wall and inner tapered steel friction sleeve as confined and compressed by the internally-tapered surface of the steel half-coupling. Deformations on the outer surface of each inner tapered steel friction sleeve discourage its longitudinal displacement with respect to the longitudinally-reinforced composit pipe whereas deformations on the tapered inner face of each steel half-coupling discourage rotational displacement of each steel half-coupling with respect to the longitudinally-reinforced composite pipe.

Therefore, the friction-grip connection between the nonmetallic composite pipe and the steel coupling system should be equally as strong as the composite pipe body itself since no part of the coupling system depends upon threaded composite pipe and the accompanying weakened condition that otherwise would result from the cut reinforcing fibers.

SUMMARY OF INVENTION

It is among the objects of the invention to provide a new and improved coupling system for nonmetallic composite pipe which has incorporated into the steel coupling a setscrew system that prevents the threaded connection from backing out, or vibrating loose.

Another object of the invention is to provide a new and improved coupling system for nonmetallic composite pipe which has incorporated into the steel coupling a flexible gasket system which seals the connection, when fully compressed, in such a manner that an internally-flush central passage is created through the coupling system.

Still another object of the invention is to provide a new and improved coupling system for nonmetallic composite pipe which is equally as strong as the composite pipe body itself, so that the composite pipe and its coupling system could be subjected to high tensile loads.

With these and other objects in view, the invention consists in the arrangement and combination of the various components whereby the objects contemplated are attained, as hereinafter set forth, in the appended claims and accompanying drawing.

In the drawing:

The FIGURE is a schematic sectional view of the coupling system.

Drawing on a typical condition as an example in describing the components of the invention, it can be assumed that the steel coupling system is affixed to nonmetallic composite pipe measuring two inches in inside diameter and 2⅜inches in outside diameter, with the inner wall of the composite pipe measuring 5/16 of an inch in thickness and containing unidirectional reinforcing fibers that are arranged in a manner that is longitudinal, or parallel with the axis of the pipe, whereas the outer wall of the composite pipe, which is ⅛ of an inch in thickness, contains reinforcing fibers that are arranged in a manner that is circular, or concentrically-wound around the inner wall of composite pipe. In such an arrangement the unidirectional or longitudinal reinforcing fibers within the inner wall of the composite pipe provide nearly all of the axial tensile strength, whereas the circular, or concentrically-wound reinforcing fibers within the outer wall are responsible for most of the composite pipe's bursting strength. Whereas the tapered friction-grip arrangement discourages the longitudinal movement of each half-coupling, relative to the composite pipe that otherwise might result in its separation from the composite pipe, the concentrically-wound outer wall discourages longitudinal movement of each half coupling in the opposite direction.

In using the applicant's coupling system for subsurface applications where it is necessary to suspend the pipe in a well by means of an elevator system, or supporting device placed beneath the famale half-coupling, and where it is sometimes necessary to retrieve, or fish, separated pipe from within a deep well, the outer perimeter of the female half-coupling in the tapered region serves as the elevator shoulder and fish neck.

In using the applicant's coupling system for subsurface applications such as deep oil and gas wells or geothermal wells where high temperatures are encountered the compressible gasket material used to seal the coupling system must be sufficiently resistant to such high temperatures. Filled Tephlon, reinforced with fiberglass, is an example of such a high-temperature resistant material. The gasket, which in cross section is concave on its top and bottom edges to provide axial compressibility, is convex in its side edges to provide a straight and flush transition through the central passage of the coupling system when the coupling is completely threaded together and the gasket is fully compressed.

In using the applicant's coupling system for subsurface applications where copper conductors have been pultruded, or otherwise incorporated into the nonmetallic composite pipe for the purposes of transmitting electrical signals or electrical power, the set-screw system also provides a means to align the copper conductors from one section of composite pipe to another, thereby locking the steel couplings and the sections of composite pipe together in such a manner that the copper conductors are perfectly aligned to form continuous electrical cricuits thoughout the entire length of the composite pipe. In such a subsurface application, circuit contacts composed of an electrically-conductive substance such as copper, aluminum, or graphite would be incorporated into the coupling gaskets so as to provide unbroken electrical circuits across the steel couplings.

The FIGURE illustrates a typical embodiment of the invention and depicts the coupling system which consists of the steel male half-coupling, 10, which is joined by threads, 11, to the steel female half-coupling 12. As the steel coupling is threaded together the gasket, shown in cross section in the uncompressed state in the inset, 13, is transformed into the straight-sided and compressed state, 14, which seals the coupling system. The steel male half-coupling, 10, is then rotated until a plurality of longitudinal grooves, one of which is designated, 15, and is cut into the steel male half-coupling, 10, at right angles to its threads, coincide with a plurality of set screws, one of which is designated, 16, and is set in the upper part of the steel female half-coupling, 12. When the grooves and the set screws coincide, or are perfectly aligned with each other the set screws are then tightened, or threaded into the grooves so as to prevent the rotation of the steel male half-coupling relative to the steel female half-coupling which are threaded together.

At the time of fabrication, when the steel half-couplings are affixed to the composite pipe, the inner tapered steel friction sleeve, 17, is pressed into the end of the longitudinally-reinforced composite pipe, 18, so as to compress and grip the latter between the deformed outer face of the inner tapered steel friction sleeve, 17, and the tapered and deformed inner face of the steel male coupling, 10, whereas the corresponding inner tapered steel friction sleeve, 19, is pressed into the corresponding end of the longitudinally-reinforced composite pipe, 20, so as to compress and grip the latter between the deformed outer face of the inner tapered steel friction sleeve, 19, and the tapered and deformed inner face of the steel female half coupling, 12. The concentrically-wound outer wall of composite pipe, 21, confines and discourages the longitudinal movement of the steel male half coupling, 10, in the direction of the concentrically-wound outer wall of composite pipe, 21, whereas the concentrically-wound outer wall of composite pipe, 22, confines and discourages the longitudinal movement of the steel female half coupling, 12, in the direction of the concentrically-wound outer wall of composite pipe, 22. Should the coupling system be employed in a subsurface application where the composite pipe and its coupling system must be suspended or elevated within a well, or where separated pipe must be retrieved from a well, the lower perimeter of the steel female coupling, 12, would serve as the elevator shoulder and fish neck, 23.

Whereas plain carbon steel would be used in fabricating the inner tapered steel friction sleeves, and should generally provide satisfactory service, in applications involving corrosive fluids this component of the steel coupling system would be chrome coated. In more demanding applications involving very high tensile loads, high-strength alloy steel would be used in place of carbon steel for the inner tapered friction sleeve for increased collapse resistance, and it would be chrome plated for use with corrosive fluids. In subsurface applications where abrasion might occur down-hole either against well casing or rock formations the outer face of the female couplings would be hard-faced with tungsten carbide opposite the threaded interval on each female half coupling.

For applications up to and including moderately-high temperatures the resin system used to bond the glass fibers together in the composite pipe would be either an epoxy, vinylester, or polyester type. For applications up to and including high-temperature applications as high as 500 degrees Fahrenheit the resin system used to bond the glass fibers together in the composite pipe would be one of the high-temperature phenolic types.

Having described examples of employing the present invention, I claim:

1. The invention of an anti back-out steel coupling system for nonmetallic composite pipe comprising:
   an inner tapered steel friction sleeve that is pressed into the end of one piece of longitudinally-reinforced composite pipe,
   a threaded steel male half coupling tapered on its interior surface against which the longitudinally-reinforced composite pipe is compressed and gripped by the inner tapered steel friction sleeve,
   a second inner tapered steel friction sleeve that is pressed into the end of a second piece of longitudinally-reinforced composite pipe,
   a threaded steel female half coupling tapered on its interior surface against which the second longitudinally-reinforced composite pipe is compressed and gripped by the second inner tapered steel friction sleeve,
   an outer wall of concentrically-wound composite pipe, which confines the male half coupling at its unthreaded shoulder, discouraging the longitudinal movement of the male half coupling relative to the longitudinally-reinforced composite pipe in a direction toward the concentrically-wound outer wall of composite pipe, a second outer wall of concentrically-wound composite pipe, which confines the female half coupling at its unthreaded shoulder, discouraging the longitudinal movement of the female half coupling relative to the longitudinally-reinforced composite pipe in a direction toward the second outer wall of concentrically-wound composite pipe, a compressible gasket to seal the coupling system when the two half-couplings are threaded together, which in the uncompressed state is covex on its inner and outer side edges and concave on its top and bottom surfaces, the same gasket, which is transformed in the compressed state, when both half-couplings are fully threaded together into a gasket that has straight-sided edges and straight-sided surfaces on the top and bottom of the gasket resulting in an internally-flush central passage through the coupling system, a plurality of longitudinal grooves cut into the male half-coupling at right angles to and across the threads at the upper part of the threaded interval, a plurality of set screws threaded into and around the top perimeter of the female half-coupling, and arranged in such a manner that they can be threaded into coinciding grooves in the male half-coupling which prevents the rotation of one half-coupling with respect to the other.

* * * * *